(12) United States Patent
Fritsch

(10) Patent No.: US 10,218,672 B2
(45) Date of Patent: Feb. 26, 2019

(54) MEASURING MACHINE COMMUNICATION WITH AUTOMATIC ADDRESS ALLOCATION

(71) Applicant: HEXAGON TECHNOLOGY CENTER GMBH, Heerbrugg (CH)

(72) Inventor: Robert Fritsch, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 200 days.

(21) Appl. No.: 14/426,119

(22) PCT Filed: Sep. 4, 2013

(86) PCT No.: PCT/EP2013/068290
§ 371 (c)(1),
(2) Date: Mar. 4, 2015

(87) PCT Pub. No.: WO2014/037404
PCT Pub. Date: Mar. 13, 2014

(65) Prior Publication Data
US 2015/0222594 A1    Aug. 6, 2015

(30) Foreign Application Priority Data
Sep. 5, 2012  (EP) .................................... 12183210

(51) Int. Cl.
*H04L 29/12*   (2006.01)
*G01B 21/04*   (2006.01)
(Continued)

(52) U.S. Cl.
CPC ........ *H04L 61/2046* (2013.01); *G01B 21/047* (2013.01); *G01D 21/00* (2013.01);
(Continued)

(58) Field of Classification Search
None
See application file for complete search history.

(56) References Cited

U.S. PATENT DOCUMENTS 5,526,576 A * 6/1996 Fuchs ................... G01B 7/012
33/503
5,615,489 A * 4/1997 Breyer ................... G01B 5/012
33/503
(Continued)

FOREIGN PATENT DOCUMENTS

CN       101803295 A     8/2010
DE    197 13 240 A1    10/1998
(Continued)

OTHER PUBLICATIONS

European Search Report dated Feb. 6, 2013 as received in Application No. 12 18 3210.

*Primary Examiner* — Peter P Chau
(74) *Attorney, Agent, or Firm* — Maschoff Brennan

(57) ABSTRACT

The invention relates to a method for allocating participant-specific communication addresses for participants in a measuring system such as, for example, a position measuring system of a coordinate measuring device with measuring sensors as participants. In the measuring system, the participants communicate via a bus system using messages with at least one communication address and message content. The messages transmitted by one participant are received by each of the other participants. The participant-dedicated communication addresses are ascertained as part of a calibrating or referencing process in which the participants monitor the messages on the bus system. If a collision by a communication address of a received message is detected, wherein the address matches the participant-dedicated communication address, a participant-dedicated communication address, which has been changed and has not collided with the received message, of the participant is allocated to said participant as a result of the collision.

23 Claims, 9 Drawing Sheets

(51) Int. Cl.
*G01D 21/00* (2006.01)
*H04L 12/413* (2006.01)
*H04L 12/24* (2006.01)
*H04L 29/08* (2006.01)
*H04L 12/40* (2006.01)

(52) U.S. Cl.
CPC ........ *H04L 12/413* (2013.01); *H04L 41/0886* (2013.01); *H04L 61/2038* (2013.01); *H04L 67/12* (2013.01); *H04L 2012/4026* (2013.01)

(56) References Cited

U.S. PATENT DOCUMENTS

| | | | |
|---|---|---|---|
| 5,666,557 | A | 9/1997 | Casidy et al. |
| 6,216,172 | B1 | 4/2001 | Kolblin et al. |
| 6,219,928 | B1 | 4/2001 | Raab et al. |
| 7,082,118 | B1* | 7/2006 | Sethi ................ H04L 29/12311 370/331 |
| 7,330,766 | B2 | 2/2008 | Kuwayama et al. |
| 7,583,373 | B2 | 9/2009 | Schwarz |
| 7,675,433 | B2 | 3/2010 | Hellwig |
| 8,493,919 | B2 | 7/2013 | Leung |
| 9,077,513 | B2 | 7/2015 | Fritsch |
| 9,341,500 | B2 | 5/2016 | Lippuner et al. |
| 2002/0001288 | A1* | 1/2002 | Fukunaga ......... H04L 12/40052 370/252 |
| 2006/0253615 | A1* | 11/2006 | Flach ................... G06F 13/385 710/3 |
| 2008/0104294 | A1* | 5/2008 | Huck ................ H04L 12/40169 710/109 |
| 2008/0273527 | A1* | 11/2008 | Short ................... H04J 3/0655 370/364 |
| 2009/0187691 | A1 | 7/2009 | Huck et al. |
| 2013/0148753 | A1* | 6/2013 | Willms ............ H04L 12/40163 375/259 |
| 2013/0275647 | A1* | 10/2013 | Bradley ................ G06F 13/385 710/309 |

FOREIGN PATENT DOCUMENTS

| | | |
|---|---|---|
| DE | 10 2006 025 174 A1 | 12/2007 |
| DE | 10 2006 050 135 A1 | 4/2008 |
| DE | 10 2009 054 904 A1 | 6/2011 |
| DE | 199 28 716 B4 | 8/2011 |
| EP | 2 270 425 A1 | 1/2011 |
| EP | 2533022 | 12/2012 |
| WO | 98/03921 A1 | 1/1998 |
| WO | 2004/039010 A1 | 5/2004 |
| WO | 2005/017448 A1 | 2/2005 |
| WO | 2006/079604 A1 | 8/2006 |
| WO | 2007/104668 A1 | 9/2007 |
| WO | 2011064317 A2 | 6/2011 |

* cited by examiner

| Message | Device I | Message | Device II | Message | Device III | Message | Device IV | Message |
|---|---|---|---|---|---|---|---|---|
|  | A1 |  | A1 |  | A1 |  | A1 |  |
| R_A |  |  |  |  |  |  |  |  |
|  | ☠ A1→A2 | A1_X | ☠ A1→A2 | A1_Z | ☠ A1→A2 | A1_Y | ✓ A1 | A1_W |
|  | ✓ A2 | A2_X | ☠ A2→A3 | A2_Z | ☠ A2→A3 | A2_Y |  |  |
|  |  |  | ☠ A3→A4 | A3_Z | ✓ A3 | A3_Y |  |  |
|  |  |  | ✓ A1 | A4_Z |  |  |  |  |
| timeout |  |  |  |  |  |  |  |  |
| R_A |  |  |  |  |  |  |  |  |
|  | Pause A2 |  | Pause A4 |  | Pause A3 |  | ✓ A1 | A1_W |
|  | ✓ A2 | A2_X |  |  |  |  |  |  |
|  |  |  |  |  | ✓ A3 | A3_Y |  |  |
|  |  |  | ✓ A4 | A4_Z |  |  |  |  |

*Fig. 5a*

| Message | Device I | Message | Device II | Message | Device III | Message | Device IV | Message |
|---|---|---|---|---|---|---|---|---|
| | A1 | | A1 | | A1 | | A1 | |
| R_A | | | | | | | | |
| | ☠ A1→A2 | X | ☠ A1→A2 | Z | ☠ A1→A2 | Y | ✓ A1 | W |
| | ✓ A2 | X | ☠ A2→A3 | Z | ☠ A2→A3 | Y | | |
| | | | ☠ A3→A4 | Z | ✓ A3 | Y | | |
| | | | ✓ A1 | Z | | | | |
| timeout | | | | | | | | |
| R_A | Pause A2 | | Pause A4 | | Pause A3 | | ✓ | W |
| | ✓ | X | | | | | | |
| | | | | | ✓ | Y | | |
| | | | ✓ | Z | | | | |

Fig. 5b

| Message | Device I | Message | Device II | Message | Device III | Message | Device IV | Message |
|---|---|---|---|---|---|---|---|---|
| | A1 | | A1 | | A1 | | A1 | |
| R_A | | | | | | | | |
| | ☠ A1→A2 | A1_X | ☠ A1→A2 | A1_Z | ☠ A1→A2 | A1_Y | ✓ A1 | A1_W |
| | | Col | | Col | | Col | | |
| | ✓ A2 | A2_X | ☠ A2→A3 | A2_Z | ☠ A2→A3 | A2_Y | | |
| | | | | Col | | Col | | |
| | | | ☠ A3→A4 | A3_Z | ✓ A3 | A3_Y | | |
| | | | | Col | | | | |
| | | | ✓ A4 | A4_Z | | | | |
| ... | | | | | | | | |
| No-Col-timeout | | | | | | | | |
| R_A | | | | | | | | |
| | ☠ | A2_X | ☠ | A4_Z | ☠ | A3_Y | ✓ | A1_W |
| | ✓ | A2_X | ☠ | A4_Z | ☠ | A3_Y | | |
| | | | ☠ | A4_Z | ✓ | A3_Y | | |
| | | | ✓ | A4_Z | | | | |
| | | | | | | | | |
| Lock | Fix A2 | | Fix A4 | | Fix A3 | | Fix A1 | |

Fig. 6

| BUS | Device I | Device II | Device III | Device IV |
|---|---|---|---|---|
|  | A1 | A1 | A1 | A1 |
| R_A |  |  |  |  |
| A1_W | ☠<br>A1→A2 | ☠<br>A1→A2 | ☠<br>A1→A2 | ✓<br>A1 |
| A2_X | ✓<br>A2 | ☠<br>A2→A3 | ☠<br>A2→A3 |  |
| A3_Y |  | ☠<br>A3→A4 | ✓<br>A3 |  |
| A4_Z |  | ✓<br>A1 |  |  |
| timeout |  |  |  |  |
| R_A |  |  |  |  |
| A1_W | Pause A2 | Pause A4 | Pause A3 | ✓<br>A1 |
| A2_X | ✓<br>A2 |  |  |  |
| A3_Y |  |  | ✓<br>A3 |  |
| A4_Z |  | ✓<br>A4 |  |  |

Fig. 7a

| Preamble | Adr_Lock | Address | Data | CRC |
|---|---|---|---|---|

Fig. 7b

| Message | Device I | Message | Device II | Message | Device III | Message | Device IV | Message |
|---|---|---|---|---|---|---|---|---|
| RA → | A1 | | A1 | | A1 | | A1 | |
| ← A1 | A1 | A1 → | ☠ A1→A2 | | A1 | | A1 | |
| | A1 | RA → | A2 | A1 → | ☠ A1→A2 | | A1 | |
| | | ← A2 | A2 | A2 → | ☠ A2→A3 | A1 → | ☠ A1→A2 | |
| ← A2 | | | | RA → | A3 | A2 → | ☠ A2→A3 | A1 → |
| | | | | ← A3 | A3 | A3 → | ☠ A3→A4 | A2 → |
| | | ← A3 | | | | RA → | A4 | A3 → |
| ← A3 | | | | | | ← A4 | A4 | A4 → |
| | | | | ← A4 | | | | |
| | | ← A4 | | | | | | |
| ← A4 | | | | | | | | |

Fig. 8

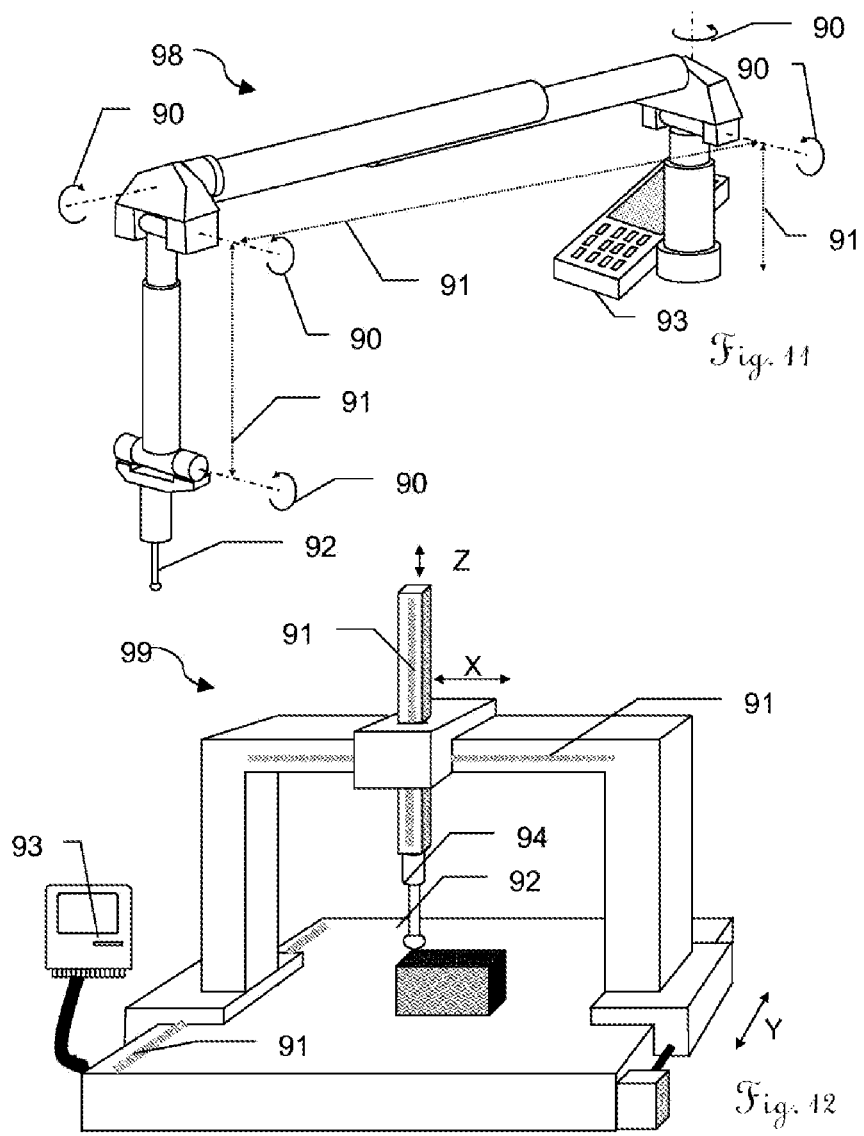

MEASURING MACHINE COMMUNICATION WITH AUTOMATIC ADDRESS ALLOCATION

FIELD OF THE INVENTION

The invention relates to a method for the automatic address iteration of participant-specific communication addresses for participants in a measuring system, a participant in a measuring system, and a coordinate-measuring device equipped with participants of this type.

In the case of a multiplicity of technical machines and installations, a plurality of electronic subsystems are interconnected in a communication network, to which a wide variety of functions can be assigned, for example sensors, actuators, switches, displays, measuring units, control systems, monitor system, monitoring and debugging devices, etc. Said subsystems can be permanently installed and connected in the machine or installation, e.g. during production, but can also be exchangeable in a modular manner, either in the event of servicing or during normal operation.

BACKGROUND

This invention relates in particular to measuring systems. Examples of such measuring systems which are designed as coordinate-measuring devices can be found, for example in WO 2005/017448, EP 2 270 425 or WO 2006/079604. These measuring systems have a plurality of subsystems, especially in the form of electronic linear and/or rotary encoders for measurement value acquisition, which are in a communication relationship with a controller for measurement value evaluation and control of the measurement processes. These subsystems are mainly disposed on the machine in a spatially distributed manner, so that the establishment of the communication connection between the subsystems participating in the communication incurs a corresponding cabling cost. In the measuring system, the participants in the communication are therefore wired to one another in order to establish the communication connection and/or a power supply. Along with the position sensors, further subsystems, for example probes, measuring heads, sensors, may also be present to record environmental conditions such as temperature, etc., or actuators such as axle drives, motorized tilt heads, display elements, etc., which similarly participate in the communication. In order to minimize the cabling costs, an attempt is made in the measuring machines to use as few communication connections as possible, preferably only one communication connection, for all subsystems involved. An attempt is also made to design the communication connections advantageously, i.e., for example, as far as possible to avoid duplicate line routing which, for example, occurs in a star-shaped cabling of each subsystem through to the controller.

Along with the subsystems described above, which are mainly permanently mounted on the measuring system, exchangeable components may also be involved in the measurement, for example exchangeable measuring heads, measuring probes, tilt heads, optical probe heads, etc., which are adapted to a wide variety of measuring tasks and are similarly incorporated into the communication. Since they may be exchanged during operation or in the event of a change of configuration of the machine, the communication system which is in operation may also be changed as a result. An exchange of a subsystem as a participant in the communication system may also be required in the event of service work and repairs.

In measuring systems of this type, the communication takes place between these devices or subsystems as the participants in the communication system, often via bus structures. For example, a bus structure, such as e.g. RS 232, RS422, RS423, RS485, or others, can be used for the communication. One conventional topology which is often advantageous in terms of the local arrangement of the participants in the measuring system is a serial structure. In the latter, the participants are disposed one after the other and are connected to the bus in each case with only one connection in each case between two subsystems. The participants often include a plurality of components of the same type, e.g. a plurality of position sensors of the same type, which communicate via the common bus with a control unit, i.e., for example, they forward the position information determined by them to the control unit. In the interests of a simple storage and maintenance, the subsystems of the same type are mainly without any difference prior to installation in the measuring system, so that they are usable at a wide variety of locations in the machine and in different machines.

However, it is important in the application to be able to distinguish and identify the subsystems connected to the bus, even if subsystems of the same type are involved. In the case of coordinate-measuring devices, it is essential, for example, during a measurement, to know which movement axis of the measuring system is being recorded with which position sensor.

For this purpose, for example, a communication address can be used which is settable in each case on the participants. This address is often only allocated immediately before or after the installation of the participant, e.g. by DIP switches, coding plugs, electronic programming devices, etc. However, a procedure of this type is prone to error and time-consuming.

A number of approaches for avoiding a manual address allocation can be found in the literature in other fields of technology. For example:

U.S. Pat. No. 5,666,557 describes an automatic addressing of peripheral devices in a data processing system using connector identifiers;

WO 98/03921 describes the automatic detection of the sequence of devices of a network communication device using a pulse length of an ancillary signal;

WO 2004/039010 describes a setting of addresses of child devices by a parent device;

WO 2007/104668 and DE 10 2006 025 174 describe an address allocation for driver assistance systems.

DE 10 2006 050 135, DE 10 2009 054 904 or DE 197 13 240 show address allocations in which, controlled by the control master, addresses are automatically allocated and the participants are assigned by reading out participant-specific information, i.e. similarly using participant-specific unique identifiers which are assigned exclusively to each of the participants.

A common feature of all these known approaches is that an address is allocated to the participants from outside. Even in the above approaches, this is still costly and in many cases requires additional hardware, such as coding switches, coding plugs, additional connector pins, etc., for this purpose. Similarly, the cost of allocating this address, whether it be in production, commissioning or during a bus initialization, is not negligible. An allocation of incorrect addresses is furthermore a frequent source of errors in measuring systems, especially when components are exchanged in the event of servicing. Not only malfunctions, but also hardware damage, can be caused by transposed addresses of communication participants.

SUMMARY

Some embodiments of the present invention therefore improve the communication of participants of a measuring machine.

Some embodiments also include providing a measuring machine communication system which is simply and economically implementable and in which an external address allocation for each participant is no longer required, i.e. especially without an explicit, unique address allocation to each of the participants from outside.

Some embodiments also include that all participants or classes of participants can be designed in the machine communication system as being of the same type in terms of their communication interfaces, and no participant-specific configuration, e.g. in the form of an address coding, is required before their use in the communication system.

Some embodiments also provide an improved communication method for subsystems in a machine, in particular in a measuring machine.

Some embodiments also provide a corresponding method for communication of participants of the measuring machine communication system in which an external address configuration on each of the participants is dispensed with.

Some embodiments are also include the provision of corresponding participant software for the implementation of the method.

In a communication system or communication method according to the invention, no allocation to the individual participants of the communication system of a participant-specific address unique in the communication system is carried out from outside. This simplifies storage, production and maintenance, and helps to avoid inadvertent errors in an address allocation or address coding.

In the present invention, the respective device or subsystem, as a participant in the communication system, gives itself its communication address using monitoring and avoidance of collisions. An automatic address iteration of participant-specific communication addresses is carried out in the participants, which converges towards a unique address allocation to each of the participants. The participants organize themselves. The control device can concentrate fully on the control task and is not required for an explicit participant address allocation from outside.

The topology of the bus that is used is no longer relevant to this invention, insofar as each participant receives all messages of the other participants on the bus. Each device can therefore track the communication on the bus and, as a result, receives information for its address allocation to itself.

All possible physical propagation paths such as optical, electrical, radio, magnetic, capacitive, inductive can be considered as a bus.

A collision avoidance method is used here according to the invention for the address allocation. However, in the event of a collision at hardware level, of the type known in the case of CAN buses or in Ethernet via coaxial cable, a collision of a simultaneously transmitted, identical bus messages is not detected, since said messages do not collide in a hardware-related manner. A collision is detectable here only if messages with different content are dispatched. If two participants transmit an identical message at the same time, the collision detection method does not respond. (Which does not usually cause further interference in normal operation, since the message was after all correctly sent to all participants.)

A message to all participants with the presence query "Are participants present?" and with the respective same response "Yes" from all participants therefore no longer helps in the address allocation according to the invention by means of collision detection.

For the collision detection according to the invention, messages with the highest possible collision probability are advantageous, i.e. especially messages with different message content. The addresses of the participants can then be iteratively determined and changed on the basis of dedicated monitoring of the communication on the bus, until a collision-free communication of all participants is established. The iterative address determination thus takes place especially at the start of the communication, i.e., for example, following the activation of the machine or installation equipped with the communication system according to the invention, or with the provision of one or more additional bus participants. Once the iterative address allocation is completed and no changes are made to the bus, the actual communication can then proceed during operation based on the addresses determined by the participants for themselves, as is the case in the prior art with addresses permanently predefined in the participants from outside.

If a common communication medium which is shared by the participants is used, such as, for example, in the case of 10Base5 or 10Base2 Ethernet or CAN, a collision of messages on the communication medium, for example on a communication line or radio channel, can therefore be detected. This is implemented in many cases by a dominant and a recessive bus state and a monitoring during the transmission. The dominant message prevails, while the participant attempting to transmit the recessive message withdraws on detecting a collision of the bus and retries at a later time, e.g. according to a predefined scheduling, to transmit its message. A message-dependent prioritization or hierarchy of the communication or the participants is thus created. For the electronic implementation of a bus system of this type, the prior art provides a wide variety of electronic modules or IP cores which can be used or simulated in functionally similar form in the context of the invention.

However, as mentioned, a collision can be detected only if the two colliding messages are different. In the case of exactly identical messages which are transmitted at the same time, no collision can be detected. Thus, for example, two participants with the same address which transmit the same response to a query at the same time would not be able to detect a collision. This may very probably occur, particularly in the case of participants of the same type which respond to the same query.

No simple approach with a global query of a device in the sense of a prompt to all participants to respond is therefore suitable for the iterative address definition. All participants would reply thereto with a response in the sense of a presence message of "Participant <address> is present!". Since these messages would be identical and would not therefore collide in the event of an address conflict, this approach is not expedient for the address iteration according to the invention. Two participants having the same address would not therefore be able to detect a collision in the case of a commonly used communication medium due to the identical nature of the messages and would not therefore be prompted to change their address present in duplicate.

In order to be able to differentiate the messages, or rather their content, a unique identifier can be dispatched with the message. For this purpose, for example, a hardware ID of a module of the communication participant can be used, since many microcontrollers, processors, memory chips, etc. have a readable specific identifier which is allocated to them or "burned in" during production. However, in many cases these IDs are often allocated merely to production batches, so that, especially in the case of participants from the same production batch, a certain probability of duplicate allocations exists.

If identifiers are unique, they are nevertheless unsuitable in many cases for direct use as an address for communication. These are especially often too long or they have a structure unsuitable for an address. For example, in the case of a bus with a maximum of up to N participants, it is not efficient to use addresses which are substantially longer than log 2(N) bits. The addressing of a participant in a ONE-WIRE bus on the basis of its ROM ID burned in during production can, for example, often take substantially longer than the actual useful data transmission, which significantly limits the bus performance.

In the case of identifiers which are too long, a hash value of an appropriate length can be calculated from the identifier, which, used as an address, is unique with a probability which, from a statistical point of view, is still quite high. If a conflict occurs on the basis of a fixed identifier of this type, it can be resolved only by exchanging one of the participants.

A random number generator, for example, can be used for a collision detection in order to obtain data which are, as far as possible, unique to each participant. In order to further reduce the probability of conflict, a plurality of random numbers generated in this way can, if necessary, also be combined with one another to form a probably unique identifier which is transmitted along with the message. However, simple microprocessors of the type often used in bus participants of measuring machines, usually offer no or no sufficiently reliable random number generators. The alternatives of software-generated pseudo-random numbers usually require complex computing and in many cases are also unreliable, particularly in the case of participants which are all of the same type. If an improbable conflict of this type should nevertheless occur, this can be resolved by a reset or restart.

One possibility, which is suitable particularly in the case of measuring systems according to the invention, is the use of sensor signals, especially of raw data to which no averaging, digital filters, etc. have yet been applied. The probability of two devices of the bus system, even of the same type, always measuring exactly the same sensor signals tends toward zero as time increases. Particularly during a calibration or referencing process of a machine which is equipped with the communication system according to the invention, all sensor signals will not, with a probability bordering on certainty, be consistently exactly identical. At the latest during a calibration or referencing process of this type, messages containing sensor values will therefore very probably, if not certainly, be different.

A method is therefore carried out according to the invention for address allocation of participant-specific communication addresses for participants in a measuring system, particularly in a position-measuring system of a coordinate-measuring device with measuring sensors as participants. In said system, the communication of the participants takes place via a bus system by means of messages with at least one communication address and a message content, wherein the messages transmitted by one of the participants are received by all other participants. During a calibration or referencing process of the participants or of the measuring system, the participants carry out an automatic address iteration with a monitoring of the messages on the bus system and a detection of a collision by a communication address of a received message which is identical to the participant-dedicated communication address, and, if necessary, a collision-related allocation of a changed participant-dedicated communication address of the participant to itself which does not collide with the receive message. In addition, an address/device allocation of the participants, wherein, in particular, the participants are identified in their sequence and/or function in the measuring system, is determined on the basis of a defined stimulation of the participants carried out during the calibration or referencing process (more precisely a stimulation of at least one sensor of at least one of the participants).

The resulting address/device allocation of the participants in the measuring system (which is not necessarily known or defined in advance in the iterative automatic address allocation), is therefore determined on the basis of a defined stimulation of the participants carried out during the calibration or referencing process.

According to the invention, all devices participating in the bus allocate themselves different, unique addresses within a short time on the basis of the then (almost) certainly colliding messages. Once different addresses have been allocated, a collision of messages occurs in an address area of the message. This can be resolved e.g. through the application of a collision detection and avoidance by means of dominant and recessive bus states. Further collisions can also be avoided a priori, e.g. by waiting for an address-dependent—and therefore unique—time period before dispatching a response to a query to a plurality of the participants, i.e. by applying a type of time slot method.

In the case of a serial structure with a bus not commonly used, a collision is not detectable by a simultaneous transmission and monitoring. In such a case, a conflict of addresses is instead detectable in that a participant receives a message which, according to the message content, was apparently transmitted by the participant itself which, however, cannot be the case with unique addresses in the communication system. In a bus of this type, this can therefore be applied as a collision condition for the collision detection of addresses allocated multiple times, causing the participant to adapt its communication address.

In the case of an address change, the device which has changed its address can notify this to the other devices in the bus, for example in the form of a message with an old and a new address which is dispatched via the bus to all other participants. This may be helpful, especially when a new participant is added following a first initialization and a unique address allocation. If other participants have linked a device identification, device functionality or device topology to the old address, this can be linked using this message to the new address and the allocation can be kept up-to-date.

This invention can be used in principle wherever participants communicate with one another via a bus. Particularly the components in measuring devices, such as articulated arms, geodetic instruments or coordinate-measuring machines, can be advantageously equipped with a communication according to the invention. The automatic address allocation according to the invention can be advantageously applied, for example, in coordinate-measuring devices with exchangeable measuring heads or probes. A measuring head newly added as a participant in the communication of the measuring system is automatically incorporated according to the invention into the existing communication system without having an address which is specifically coded for it from outside and is unique in the measuring system. Following the automatic address adaptation on the basis of a collision detection described here, the new participant allocates a unique, conflict-free address to itself and is thus incorporated into the measuring system.

Similarly in the event of servicing, subsystems according to the invention participating in the communication system can simply be exchanged without a service technician having to allocate a communication address to the replacement component which corresponds to the address of the exchanged participant. Similarly, no adaptations need to be made to the machine configuration, since the communication structure is not changed by the replacement subsystem.

BRIEF DESCRIPTION OF THE DRAWINGS

The method according to the invention and the device according to the invention are described in detail below purely by way of example on the basis of specific example embodiments which are shown schematically in the drawings. Further advantages of the invention are also discussed. In the drawings:

FIG. 5a shows a diagram of a first example of a process of a machine communication according to the invention;

FIG. 5b shows a diagram of a second example of a process of a machine communication according to the invention;

FIG. 6 shows a diagram of a third example of a process of a machine communication according to the invention;

FIG. 7a shows a diagram of a fourth example of a process of a machine communication according to the invention;

FIG. 7b shows an example of a message, indicating how a message can be structured;

FIG. 8 shows a diagram of a fifth example of a process of a machine communication according to the invention;

FIG. 11 shows a first example of an embodiment of a measuring machine in which the machine communication according to the invention is applied;

FIG. 12 shows a second example of an embodiment of a measuring machine in which the machine communication according to the invention is applied.

DETAILED DESCRIPTION

A wide variety of systems and physical propagation paths can be considered as a communication bus within the meaning of the present invention. The communication interfaces can, for example, be designed as specified in RS232, RS422, RS423, RS485, but can also follow other specifications. For the physical communication, a multiplicity of electronic components or IP cores are known for communication interfaces in the prior art, which can be used according to the invention for communication in each case between the participants. According to the invention, each connected participant in the communication system can receive all messages from all other participants, and transmitted messages of each participant are correspondingly receivable by all other participants. This can be ensured physically or logically, for example through forwarding of bus messages.

Figure 1A:
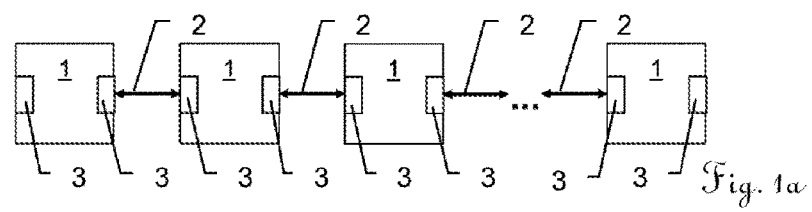
FIG. 1a shows a first example embodiment of a communication system according to the invention.

FIG. 1a shows a first example of a communication system according to the invention with a bus in a serial structure, in which the physical communication lines 2 in each participant 1 are separated through hardware. In the case of a participant 1 which is not located at the beginning or end of the bus, communication takes place with a first and at least a second communication interface 3, via which communication interfaces 3 the participant 1 is in a communication relationship in each case with a preceding or following participant. As a result, the participant 1 can distinguish the left neighbor from the right neighbor, i.e. the preceding or following participant, according to the interface 3 that is used. The participant 1 forms, in a manner of speaking, a chain in the communication system, and the communication between the participants takes place on a one-to-one basis, i.e. directly between two participants 1. In order to direct messages dispatched according to the invention to all of the participants 1, said messages are transmitted in each case to both interfaces 3 of the message-generating participant 1. Each participant 1 furthermore forwards messages received on the first interface 3 on the second interface 3, thereby acting, as it were, as a repeater. In order to implement more complex topologies, participants 1 (not shown here) with more than two interfaces 3 may be present, wherein it is similarly ensured that all participants in the communication system receive all messages.

Figure 1B:
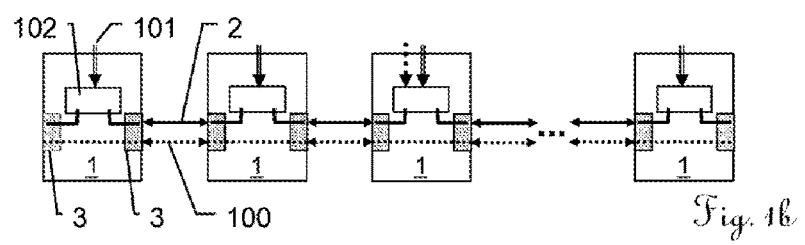
FIG. 1b shows a variant of the first example embodiment.

FIG. 1b shows a variant of the embodiment from FIG. 1a in which, along with the serial structure for the data communication, preferably via the same plug-in connection, a global transmission of a common clock signal (or clock synchronization signal) and/or a trigger signal takes place, which can especially, as, for example, in the aforementioned reference, take place in the form of a combined clock-trigger signal. An additional global clock signal and/or trigger signal of this type can also be applied in other embodiments of the invention.

Figure 2:
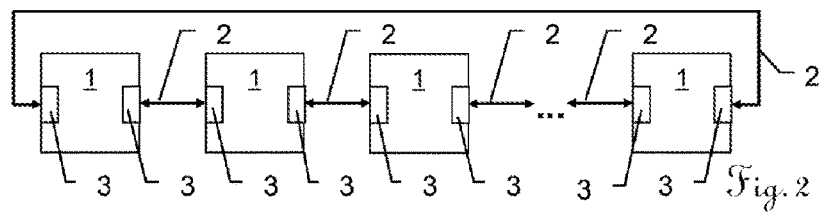
FIG. 2 shows a second example embodiment of a communication system according to the invention.

FIG. 2 shows a second example of a communication system according to the invention with a bus in a serial structure which is closed to form a ring, in that the last participant is also connected to the first participant 1 with a communication connection 2. This return connection from the first to the last participant 1 can, for example, also be effected via the same cables as the forward connection, so that visually the impression of a serial structure, but communicatively a ring, is created. For example, specific end connectors on the first or last participant 1 can be used for this purpose, or an automatic detection of an unoccupied communication interface 3 and a resulting automatic return connection can be effected. Each participant 1 must therefore then transmit its message on an interface 3 in order to reach all of the participants 1. Also, the communication therefore no longer needs to be effected in both directions, but communication can also take place here in one direction only in order to reach all participants 3. However, in a ring of this type, it must be ensured that the same message does not circulate multiple times in the bus, for example in that a participant 1, on receiving a message transmitted by it on the respective other interface 3, does not forward this message.

In the bus system as in FIG. 1 or, where appropriate, also as in FIG. 2, with the use of interfaces 3 which operate in half-duplex mode, access conflicts may arise in the event of a simultaneous transmission and reception of messages. Said conflicts can be avoided by means of a buffer storage of the message to be transmitted in the relevant participant 1.

A buffer storage of messages can generally be carried out within the participant in order to avoid access conflicts on the interface 3, which may occur, for example, if a forwarding of a received message and a simultaneous transmission of a dedicated message are pending, or a dedicated message cannot currently be transmitted, since a commonly used communication medium 2 is occupied at this time by another participant 1.

Figure 3:
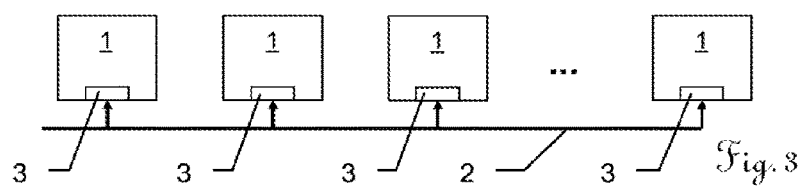
FIG. 3 shows a third example embodiment of a communication system according to the invention.

The bus system shown in FIG. 3 is a third example of a communication system according to the invention with a bus which uses a common communication medium 2 via which the participants 1 can communicate with one another. Here, the participants 1 then require only one single communication interface 3 to transmit and receive messages. Cabling can be implemented here with one single connector for two cables or with so-called T-pieces. Two or more connectors with a direct hardware through-looping of the communication lines can also be used. The latter may visually create the impression of a serial structure, but, communicatively, is a common communication medium.

The communication takes place via a global bus line 2 to all participants simultaneously. A wide variety of approaches are known for dealing with access conflicts of the multiplicity of participants 1 to the single, common medium 2.

Along with the ALOHA protocol or a multiplicity of other approaches, a collision detection according to the dominant-recessive approach is in many cases widespread in technical communication systems, mostly in connection with a corresponding collision avoidance through immediate withdrawal of the recessive participant. If a plurality of simultaneously responding participants 1 with differing message content are present, the participant which has transmitted the most dominant message prevails on the bus. A collision is therefore detected by dominant and recessive bus states. A collision can be detected by monitoring the message present on the communication medium during the transmission, i.e. a simultaneous transmission and reception and a comparison of the transmitted and received messages. If a collision is detected, a recessive participant 1 must subsequently start a new transmission attempt in order to transmit its message. Through an immediate withdrawal of a participant 1 with a recessive message from the bus, it can be ensured that, even in the event of a conflict, at least the dominant participant successfully forwards its message on the bus, thus enabling a good bus throughput even in the event of conflicts.

Figure 4:
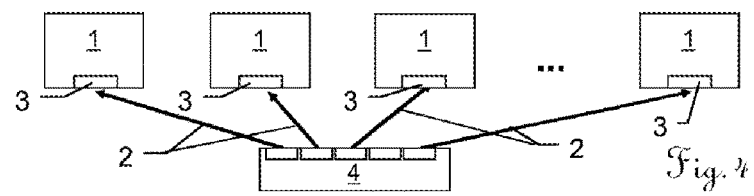
FIG. 4 shows a fourth example embodiment of a communication system according to the invention.

The bus system shown in FIG. 4 is a fourth example of a communication system according to the invention with a star-shaped cabling of the participants 1 with a commonly used bus, which is implemented via a so-called HUB 4. This HUB 4 can be designed actively or passively, wherein, in the passive case, this can also be referred to as a node point 4 with spur lines 2 through to the participants 1.

Along with the primary forms shown above, more complex topologies or combinations of the systems shown can be used for the communication according to the invention. Detailed aspects of implementations such as terminations, line impedances, etc. are not described here, but reference is made to corresponding technical literature. Click save The method according to the invention for communication between participants 1 in a measuring system is described below on the basis of a number of example embodiments. This specifically involves a position-measuring system of a coordinate-measuring device with measuring sensors as participants 1.

In the measuring system, the communication of the participants 1 takes place via a bus system, wherein all messages of one of the participants 1 are received by all other participants 1. The participants 1 in the measuring system in each case have participant-dedicated communication addresses.

According to the invention, these participant-dedicated communication addresses are determined in particular iteratively, in that each of the participants carries out a monitoring of the messages on the bus system. If a collision is detected, i.e. of a communication address of a received message which is identical to the participant-dedicated communication address, an allocation of a changed participant-dedicated communication address of the participant 1 to itself, which does not collide with the received message, is carried out as a result. In particular, the participant-dedicated communication address is stored here only in volatile form in the participant 1.

The participants 1 of the communication system have interfaces 3 for exchanging messages via which a communicative connection can be established between the participants via the bus system. A wide variety of functions and tasks can be assigned to these participants 1, for example sensors, actuators, gateways, control devices, etc.

As already mentioned, the communication takes place in the form of messages which can be transmitted and/or received via the communication interfaces. The messages entail digitally presented information which is forwarded in the form of data streams, normally transmitted in packets, via the interfaces to the other participants. The data content of these messages is to be interpreted accordingly and has at least one communication address and a message content. For example, a message may have a preamble, an address area, a command area, a data area, a checksum area or a combination of these areas defined according to the transmission protocol that is used.

In the communication system, there may be addresses or areas of address values which effect a broadcast, which targets all participants 1, a multicast, which targets a subset of the participants 1, and/or a unicast, which targets only one specific participant 1. In the processing of the message in the participant 1, a response to the message may be generated if necessary and transmitted by the participant 1 to one or more other participants 1. The generated response is dispatched via the bus to all other participants 1. In the case of some messages, a response may also be absent and nothing may be transmitted. Although all participants 1 receive the dispatched messages, only those participants 1 which are targeted by the destination address in the message process the message.

The communication can take place in the measuring system, in particular with a cyclical polling of sensor values. For example, the communication may be carried out periodically, e.g. on the basis of a measurement clock or control clock, event-based, e.g., instigated by a triggering, an acquisition is effected of a measurement value and by means of a read-query message of the capture values of the triggering, or in a combination of both.

However, the participants 1 per se have no explicit address uniquely allocated to them in a participant-specific manner from outside. The communication method applied according to the invention without external address allocation is based in terms of its fundamental principle on a monitoring of the bus communication and a detection of any address conflicts. If such a conflict is detected by a participant 1, it spontaneously changes its address in order to avoid further conflicts. This is carried out until all participants 1 in the communication system have a unique address.

In the case of a serial structure without a commonly used medium, as in FIG. 1 or FIG. 2, a conflict can be detected if a message is received by a participant 1 which, according to the sender address, was apparently sent by it.

A closed ring structure as in FIG. 2 may form an exception here, in which a dedicated message can again be received. Since the messages transmitted by the participant 1 are known to the participant 1, this exception can be detected in a ring on the basis of the message content and can be handled accordingly in a different manner.

In the case of a commonly used communication medium as in FIG. 3 or FIG. 4, a hardware collision of messages, which can be detected by a monitoring of the dedicated message during the transmission, may occur on the common resource communication bus. Furthermore, a conflict in the case of messages transmitted with a delay can also be detected here if, as described above in the case of the serial structure, a message provided with the dedicated address as the sender address is received.

However, the conflict of identical addresses does not express itself in a hardware conflict of the addresses, since identical data transmitted at the same time by definition do not collide, i.e. do not cause any hardware collision on the bus.

A detection of a collision of the communication address can be established in that, although no conflict occurred in a communication address area of the message, a conflict nevertheless occurred in a different area of this message, in particular in a useful data area of the message. A collision by a communication address of a received message which is identical to the participant-dedicated communication address is thus detectable by means of a collision-free transmission of the area of the communication address of the message, but a collision in the area of the message content of the transmitted message. This indicates that at least two participants 1 had in each case transmitted a message at the same time with the same communication address, i.e. no collision of data, but a collision of a plurality of identical communication addresses must be present, which is based on a multiple allocation of this communication address. This, at first glance unusual, definition of a communication address conflict is derived from a non-collision of simultaneous, equal-value messages on the common communication medium.

With a dominant-recessive approach, one of the participants 1 on the bus in each case prevails. This participant retains its address. The device(s) which does/do not prevail may, if the conflict did not occur in the address area but only in the data area, change its/their address according to a mapping function and may try again to respond with the new address. A collision may again occur here, which is resolved by the collision avoidance method, and so on. As soon as all devices which previously had the same address have changed their addresses and have responded to the query without conflict, they have different participant-dedicated addresses. However, due to the address changes carried out therein, some of the participants may then in some cases have addresses which are already allocated elsewhere in the communication network due to the mapping that is carried out.

In order to resolve these conflicts, a device which receives a message which has its sender address can similarly change its address following a mapping function in order to prevent, a priori, future conflicts.

The method according to the invention can ensure a high collision probability or collision detection probability of the messages due to the transmission of a putatively participant-unique content in the messages. A participant-unique content of this type can be established, for example, on the one hand by a random number in the message generated in the participant or, on the other hand, by a sensor measurement value defined by the participant in the message.

A participant 1 which detects the collision of its communication addresses can thus carry out an allocation of the new communication address to itself using a mapping function, wherein the mapping function may depend on the participant-unique content. The changed, collision-free, participant-unique communication addresses can also be defined using a mapping which is carried out by incorporating a value which represents the difference in the conflict of the received and the transmitted messages or a dedicated message which is potentially to be transmitted. Simultaneous changes of the same type of the address in a plurality of the participants and, as a result, new arising conflicts can thus be avoided or the probability thereof can be reduced.

A participant can transmit a message with its old and its new address during or after the allocation of a changed communication address to itself. As a result, the other participants are informed of this change and can, for example, update their address tables, or further changes can be made to addresses in participants on the basis of this message in the case of a new conflict, until a unique state is established.

The self-allocation of a changed participant-dedicated communication address can be activated and/or deactivated. For example, with the deactivation following a reception of a specific LOCK message, one or more of the participants can fix their participant-dedicated communication address in a volatile manner and can allow no further self-allocation of a changed communication address to be carried out. A timeout after the last address-related conflict on the bus system can also be applied to fix the address. The activation can be carried out, for example, by means of a RESET message, a reset signal or by shutting down the participants with a consequently reactivated self-allocation of a changed communication address.

A freedom from collision of the message content, e.g. associated with a timeout or with the completion of a calibration or referencing process, can be detected as an indication of a convergence of the address iteration, whereupon the allocation of participant-dedicated communication addresses is deactivated as described. For example, the unique participant-dedicated communication addresses defined here can be stored following the convergence of the address iteration in a non-volatile memory. Especially, the stored communication addresses can serve in future as an initial value for a subsequent new address iteration.

In addition to the bus system, a triggering and/or a synchronization of participant-internal, local clock signals for all of the participants 1 can be implemented via the same participant cabling. Synchronization lines of this type are, for example, conventionally used in measuring systems in the form of a trigger line for activating messages. For this purpose, the participants 1 are normally connected via an additional, commonly used line via which the corresponding signals are transmitted. In particular, a combined clock-trigger signal can be used here which is applied to all devices, as described in EP 2 533 022. A local clock signal synchronized here in the participant can be used for the timing of the communication and/or the measurement value acquisition.

The participants 1 of the measuring system communication have a message processing unit which is designed in such a way that it carries out a communication method according to the invention. Furthermore, the participants 1 are equipped with at least one communication interface operable by the message processing unit, via which the communication can be established to all other participants 1 of the measuring system.

In order to generate a participant-unique content, the participant 1 may have a random number generator and/or a measurement sensor.

A number of example embodiments of communication processes in a measuring machine communication system according to the invention are presented below in tabular form for further explanation, wherein the processes are presented in each case chronologically in rows below one another. However, this listing is not exhaustive, but serves merely to explain the communication principle according to the invention.

FIG. 5a shows a first example of a process of a communication according to the invention, in which, following the activation, e.g. by a control device or measuring machine controller, a query prompting the transmission of all respective sensor signals is transmitted on the bus. All bus participants present respond thereto and, if necessary, change their addresses according to the scheme described above if address conflicts occur therein. All participating devices then have different addresses, which can be verified, if necessary, by the control device by means of a repeated transmission of a query to all participants.

An automatic address allocation of this type can be carried out, for example, anew with each activation. As a result, the participants do not need to have non-volatile memories for storing their address.

In detail, the participants are shown in each case in the columns as device I to IV, along with the messages exchanged between them. The devices are all connected to a bus system with a common communication medium looped through from device to device and communicate via said medium in each case with all other participants. The rows represent downward a chronological process which makes no claim to completeness.

As shown in the first row, all devices have the same address following activation or a reset of the communication system, in this example A1. One of the devices, which is not shown here, e.g. a control device or measuring machine controller, transmits a query R_A to all participants, i.e. a broadcast with the content "all transmit your sensor signals", which is shown in row II.

As shown in row 3, all devices then respond simultaneously with a message which is made up of at least the participant-dedicated address and the participant-specific sensor values. Device I, for example, therefore with the message A1_X, wherein X represents the current measurement value of the device, device II with the message A1_Z, etc.

The participant IV with the most dominant message A1_W prevails here on the dominant-recessive-designed bus system. Participant IV retains its address, the other participants detected a conflict and consequently change their own address.

A mapping for the message identifier x is stored in each participant. This is advantageously designed in such a way that the changed communication address generated by the mapping is potentially conflict-free. Without restricting the generality, an address x in the form of a number from the range of integers and a mapping function of the address x in the form of $f(x)=x+1$, which is shown here as the address Ax, is used in the figure to explain the principle. In practical implementations, the type and/or value range of the address and also the mapping function may also be different, in particular more complex. For the sake of clarity, however, reference is made to this simple example in order to explain the principle according to the invention. As shown here, the devices which have not successfully transmitted their message therefore change their address from A1 to A2. A mapping can also be carried out as a function of a measurement value S acquired by the device in the form of $x=f(x, S)$. For example, a hash function of the measurement value S or the low-order, mainly unstable bits of a raw measurement value of a sensor can be used as the new address, which can also be offset against the old, conflict-affected address. Since each participant with high probability acquires a different measurement value, this hash value is also with high probability different and the resulting address is thus unique.

In row 4, the previously unsuccessful participants again attempt to transmit their messages with their new address A2, which participant I also successfully achieves.

In row 5, devices II and III again attempt to transmit their messages with the address now changed to A3. Device III with the message A3_Y prevails over the message A3_Z.

Finally, in row 6, the participant II also transmits its message A4_Z, after it has itself changed its address to A4 due to the preceding conflicts.

The control device can wait until it no longer receives any messages for a specific time period, which indicates that all participants were successful.

However, in the automatic address allocation, the allocation to the devices may turn out differently for each allocation. Particularly if sensor signal information is used in the messages in order to establish a high probability of collision, the address allocation and sequence of the devices may, however, turn out differently depending on the measurement values with each allocation, and may therefore also not be known.

If the address-device allocation is not important in this communication system, this represents no further problem. However, if the sequence of the devices and their allocation to functions, etc., is essential for the application, this can subsequently be determined, for example, using the measurement values of the respective participants 1 in the communication system. To do this, for example, a defined stimulation of the sensors of the participants can be carried out in an initial referencing or calibration of the measuring system, in particular in a defined sequence. Thus, for example, a referencing or calibration of movement axes can be carried out, e.g. in a self-calibration described in WO 2011/064317, in particular in a predefined sequence, as a result of which the respective participant is allocable for the position sensing of these movement axes on the basis of the measurement values of the movement axis which changes during the referencing. The sequence of the participants or their functional allocation can thus be defined on the basis of the sequence of the movement axis referencing or calibration.

In the preferred embodiments of a measuring system according to the invention, in which the address-device allocation is important, i.e. the sequence of the devices in the measuring system or, in other words, the allocation of the iterated communication addresses to functions, tasks, positions, installation locations, etc. of the participant in the measuring system is essential for the application, this is determined according to the invention on the basis of the measurement values of the respective participants 1 in the communication system, in particular during or following the address iteration, especially in the commissioning of the measuring system in its current configuration. For this purpose, a defined stimulation of the sensors of the participants is carried out in an initial referencing or calibration of the measuring system, in particular, for example, in a defined sequence. The term "defined" is to be understood here to mean that the stimulation of the participants has at least one known characteristic, by which one or more of the participants is identifiable in its function and/or position in the measuring system during the referencing or calibration. The specific design may depend strongly on the structure of the measuring system, for which reason the examples described below are not to be considered as exhaustive.

An initialization or referencing of this type is in any event required and customary in measuring systems such as e.g. coordinate-measuring devices, especially following activation, a change of measuring head, a change in deployment, etc. Participants equipped with measuring sensors, especially their evaluation hardware and software, often require a stimulation of this type during the initial commissioning, following activation, and/or in the event of changed environmental conditions in order to initialize themselves. For example, the participants carry out a self-calibration, in which compensation parameters are determined in order to achieve a high accuracy of the sensor value acquisition. However, even before the completion of a calibration and/or referencing of this type, the participants can supply measurement data which, although they do not necessarily have the full achievable or specified accuracy or reference basis, are sufficient for identification purposes in an address allocation according to the invention.

Thus, for example, a referencing or calibration of movement axes (e.g. in the aforementioned self-calibration from WO 2011/064317) can be carried out not only in a predefined sequence of the stimulation of the participants through movement of the position sensor, but also, for example, using the value range of the respective participant, on the basis of dependencies between a plurality of participant measurement values, on the basis of measurement values at one or more known reference points or differences between the latter, on the basis of measurement value changes when working through a known reference pattern, on the basis of physically related dependencies between sensor values of different participants, on the basis of measurement ranges (e.g. on the basis of different lengths of movement axes, measurable angular ranges of rotary encoders, etc., in particular in covering the entire procedural range in an initialization, referencing or calibration), etc.

According to the invention, this time and stimulation of the respective participants, usually required in any event, can be used for a self-calibration of this type not only for the address iteration, but also for the identification of sensor value acquisition on the basis of the measurement values which change during the referencing, i.e. the participant can be allocated with its iterated communication address to its respective function and/or position in the measuring system. For example, in the case of a movement axis, the participant in each case physically associated with the latter, i.e., for example, a position sensor or position detector for this movement axis, can be identified on the basis of the position values acquired by the latter during the referencing and, in particular, can be allocated to its iterated communication address. For example, the position sensor can be identified as being associated with a defined movement axis on the basis of the measurement values which change during the referencing according to a known pattern.

This position sensor can be referenced below explicitly by its communication address, or measurement values determined by it can be allocated to these movement axes. Thus, during a calibration or referencing, along with the automatic address iteration, the sequence of the participants or their functional allocation can be determined on the basis of the sequence of the movement axis referencing or calibration.

No querying and data retention of unique data of the participants, such as serial numbers or the like, are required. For example, participants can therefore be exchanged, transposed or supplemented as required, without the need for adjustments to the participant or otherwise to the measuring system. A plurality or all of the participants may therefore, for example, be exactly the same, in particular from the perspective of the communication bus, before the application of the present invention which, as mentioned, significantly simplifies e.g. storage and servicing. Especially, the participants do not require any differences (such as, for example, a unique identifier) in their software or in a memory module in order to be used as a basis for addressing and/or identification. In the address allocation according to the invention, a readout of a serial number or a different participant-specific identifier encoded in the participant is not a mandatory requirement.

In a measuring system with position value detectors, such as, for example, a CMM or an articulated arm, a theodolite, etc., the movement axes defined in a, in particular initial, calibration can be stimulated in that e.g. the device axes are moved. Such a movement of the axes is usually required in any case for calibration in measuring systems of this type, e.g. for a self-calibration of the position value detectors, wherein compensation parameters are determined for the sensors and evaluation circuits of the participants, such as, for example, in WO 2011/064317, or for calibration and/or referencing of the entire measuring system. Although the position detectors require these compensation parameters for the highly accurate position determination necessary in the application, the measurement values determined without, or without exactly defined, compensation parameters (which may be correspondingly more inaccurate) are nevertheless sufficient for an identification of the participants in terms of their position and/or function. In measuring systems of this type, the address iteration and/or identification can therefore be carried out without additional effort and loss of time.

Such a calibration and/or referencing of the measuring system can be carried out, for example, by moving to one or more reference points, by positioning in one or more defined positions (e.g. in a two-layer measurement), by travelling a reference path, by moving over the entire measurement range of the position value detector, by performing a defined sequence of movements of the individual axes, by the movement of one axis until an associated limit switch and/or reference switch is reached. A monitoring of design-related physical dependencies between the measurement values of different participants (e.g. axis of rotation+inclination sensor, measuring scanning head+machine movement axes, proximity sensor+position value detector, sensor of a motor control circuit (current/torque, speed, position, etc.)+position gauge associated with this axis, etc.), can be applied, or a touching of a temperature sensor with the hand so that the measurement value of said sensor rises above room temperature can be used as a defined stimulation. On the basis of defined stimulations of this type of in each case at least one sensor value of at least one of the participants, this participant can be identified and its iterated communication address can be allocated to this participant, i.e. its position and/or function in the measuring system. If a participant acquires a plurality of sensor values (e.g. temperature and position or the like), a stimulation of one of the sensor values of the participant suffices accordingly. The stimulation can be carried out here manually by hand or by means of actuators influencing the sensors of the participants.

The communication of the participants can thus be allocated to the sensors of the system without the participants having addresses predefined from outside. The addresses do not need to be fixed or identical for each iteration, and may also therefore turn out completely differently in the case of a plurality of iterations, or different numbers or characteristics of participants may be present. In the principle according to the invention, for example, an addition, removal or exchange of participants can take place, in particular also as a so-called hot plugging during operation, for example with a manual or automatic tool or measuring head exchange of a CMM in which, for example, movement or measurement axes can be added, removed or exchanged. Particularly in the case of high-precision CMMs, a referencing or calibration is required in any event following an exchange or configuration change of this type in order to ensure the required precision. During a referencing or calibration of this type, the new or changed participants can be incorporated into the communication system of the measuring system with the principle according to the invention. All or some of the participants may, particularly from the perspective of the communication interface and the communication software, be exactly identical and, for example, no unique serial number of the participants needs to be read out or used in the identification or such a serial number does not necessarily need to be accessible by means of the communication bus.

An example of a normal communication operation is then shown in the lower part of FIG. 5a, following the above, initial establishment of unique addresses. In response to a new query R_A from the control device of the measuring system, all participants transmit their values with their addresses. A transmit prioritization according to the dominant-recessive approach can then be used once more in which the dominance is then already defined by the address area of the message. However, the figure shows a different variant in which collisions are avoided a priori in that, before the transmission of the message in response to the broadcast query, each participant waits for a waiting time Pause_A1, etc., depending on its address. Due to this timeslot method, access conflicts can be preventively avoided, and, as in the case of the dominant-recessive approach, the temporal sequence of the responses is defined. Alternatively, the respective waiting time can also be fixed during the initialization phase and the response sequence can thus be defined.

Due to the defined sequence, even the transmission of the sender address could therefore be dispensed with and communication efficiency could thus be increased. Thus, in the embodiment shown in FIG. 5b, with a simple measuring system with only broadcast queries for readout of sensor and/or trigger values, explicitly known addresses can therefore be more or less entirely dispensed with. The addresses A1 to A4 shown in FIG. 5b degrade here, as it were, into participant-internal waiting time parameters, for example in the form of a number of timeslots to be waited with the length which corresponds to the time period of a transmission of a measurement value on the bus. In the event of a conflict on the bus, a participant increases this waiting time with a recessive message (Pause in the figure) in each case by a timeslot of this type. Since a monitoring of the entire communication takes place in any event, the response messages of the other participants can alternatively also be counted and the waiting time can be determined dynamically, on the basis of the number of previously dispatched messages of the other participants.

The conflicts are thus resolved in a manner similar to that shown in FIG. 5a, wherein the address areas Ax_ are absent from the messages and only the sensor values are transmitted. Prior to their transmission, the waiting time Ax is waited. The addresses therefore now represent only participant-internal, temporarily stored delay values or waiting times.

No waiting times are shown here in the upper part of the figure. Following a collision, a waiting time of this type is also not required, since a new transmission attempt is in any event started only in the next time slot or on completion of the preceding message, which is similarly equivalent to a waiting time incremented by one.

The participant sequence is derived uniquely from the sequence of the incoming messages. A simple and efficient communication can thus be implemented in a measuring machine which requires no external allocation of addresses to the participants, for example in the form of coding, but in which the participants spontaneously allocate themselves unique addresses which are used in this example embodiment as participant-specific waiting times for conflict-free communication (and do not necessarily have to be explicitly communicated outwardly). A unique allocation of measurement values to the participants is similarly provided on the basis of the response sequence, and an allocation of the participants to the measurement axes can be carried out as described in a calibration or referencing which is in any event necessary.

FIG. 6 shows a third example of a process of a communication according to the invention. The upper part of the communication is similar in its process to the process shown in FIG. 5. The dominant messages are in each case shown with grey shading. In contrast to the previous case, a collision message Col is dispatched here on detection of an address collision of the participant concerned in order to alert other participants to the existing address conflict. Along with a pure indication of the existence of a collision, the collision message may also contain further information, e.g. information on the collision or on the address change carried out as a result thereof, for example in the form of an old and a new address and also further information relating to the conflict.

After no further collision message has occurred on the bus after a certain time, all participants should have allocated themselves unique communication addresses, which is shown in the diagram by No-Col-timeout.

As an example, a communication can then be carried out in the form of a broadcast R_A which targets all participants, in which each participant transmits back a response with its measurement data. For example, an actual value or a buffered measurement value of a preceding triggering of all position sensors can be queried in a measuring device with a communication of this type. The participant devices I to IV mark their messages with the sensor value and with their previously self-defined, participant-specific address.

Using this address, not only is the allocation of a measurement value to a device ensured, but the address also serves to allocate the communication line. Following the query R_A, all participants attempt to send their response, but only participant IV succeeds therein, since it has the dominant message. However, in contrast to previously, this results in the collision in the address area of the message and not, as in the case of address conflicts, in the data area. This does not therefore entail an address conflict, but rather a normal conflict of access to the common resource, which is resolved by an immediate withdrawal of the recessive participants. In the case of a conflict of this type, no allocation of a new address is effected in one of the participants. The distinction with regard to whether the conflict takes place in an address area or a data area of the message can therefore be applied as a criterion to determine whether an address change is carried out or not.

In the following rows, in which a new attempt is made by the remaining participants to transmit the previously recessive messages, the messages of all participants, arranged in order of their dominance (which depends in particular on the participant address), are gradually transmitted.

An allocation of the messages to the devices can thus be established not only via the addresses, but also via the sequence of the arrival of the messages.

In the bottom row, the transfer of a LOCK message is shown, with which all targeted participants temporarily fix their current participant-dedicated address. No further changes are then made by these fixed participants themselves to their own address, even in the event of collisions. As shown, this LOCK message can be directed as a global broadcast to all participants, but also, using the participant-dedicated addresses, specifically to defined participants or participant groups.

Thus, for example, if a further participant is added, the already present participants can be prevented from changing their addresses. Even in the event of conflicts due to any transmission errors in the communication, an unnecessary changing of addresses can thus be avoided. In order to prevent a dominance of the newly added participant, a fixed address can be marked, for example, with a highly dominant bit in its address, due to which each message of an added participant with no fixed address is in any case recessive.

This fixing can be cancelled, for example, by a reset message, a reset signal or a shutdown of the participants.

FIG. 7a shows a fourth example of a process of a communication according to the invention. The commonly used communication medium is shown as only one single, grey-shaded column BUS, in which the dominant message is in each case shown. The process is similar to the process shown in FIG. 5a or similar to FIG. 5b, if the Ax_ prefix is in turn deleted here from the messages on the bus.

FIG. 7b shows one of many examples illustrating how a message can be structured. This is not to be regarded as limiting, since there are countless possibilities for designing messages in a communication system according to the invention, which can be supplemented or shortened by corresponding ranges.

The message example shown has a preamble, i.e., for example, a start bit, etc. This is followed by an optional Adr_Lock area described above, for marking fixed addresses, e.g. in the form of a LOCK bit. The address area of the message contains the participant-specific address, stored in volatile form, as e.g. A1, A2, A3, A4 from the above examples. The data area Data may contain the sensor values, but also other commands and/or data. The message ends with a checksum CRC, with which the data integrity of the message can be established and/or an error correction of transmission errors can also be carried out.

A dominant-recessive transmission can be implemented in simple fashion, for example by a line provided with a pull-up resistor, which can be connected in each case by means of a switch to GND for transmission in the participants in order to transmit a dominant bit. The monitoring can be implemented by means of a simple evaluation of the current level of the line. A simple, sufficiently known UART communication can be used here. However, a number of more complex approaches, for example in the form of integrated circuits such as CAN, RS485 or other driver modules, are available for this purpose.

FIG. 8 shows a fifth example of a process of a communication according to the invention, in which the devices are disposed in a serial structure according to FIG. 1 or FIG. 2 and the participants communicate accordingly in each case to the left and right in each case with a neighbor. Received messages are forwarded in each case on the other side, so that a message can always reach all of the participants. Messages which cannot be transmitted immediately due to a busy communication interface are temporarily stored in the participant and are only subsequently dispatched. In the case shown here, a temporary storage of received messages and/or messages self-generated by the respective device is therefore implemented in order to avoid access conflicts at interface level.

In response to the query RA, device I transmits the message with the sender A1 to all other participants, i.e. to the left and right. The message RA is then similarly forwarded to device II.

Device II then receives a message with A1, detects a conflict with its own address, which also reads A1, and changes the latter to A2. Furthermore, the message with A1 is also forwarded to device III. In response to the subsequent query RA, device II transmits a message with its changed address A2 to the left, where the latter is forwarded by device I, and to the right. The similarly pending message RA is then forwarded to device III.

Device III detects the conflicts with the received messages A1 and A2 and changes its address to A3. Furthermore, it forwards A1 and A2 to device IV. On receiving the message RA, it transmits A3 to the left and right, where this message is in each case forwarded, and also forwards RA to device IV.

A similar process takes place with device IV and so on.

All participants have thus allocated themselves participant-unique addresses A1 to A4. Their sequence corresponds in this case to the physical sequence of the participants in the bus system. In other mappings of the addresses or other transmission sequences, the sequence could also turn out differently, but is identical on each activation.

Both in the case of a bus with a common medium and also in the case of a serial structure, in a further, alternative, more extensive design or extension, each device which changes its address can additionally generate and transmit a query message to this new, changed address. If a reply is received in response to this query, the changed address is already allocated, and the address is further modified until no response is received and therefore no further participant in the communication system has the same address. A check of this type on the uniqueness of the dedicated address can take place following the previously described collision resolution using a first, global query, i.e. if all participants were able to respond successfully to this global query.

A so-called "deadlock", in which a plurality of sensors constantly change their address and no stable final status is reached (or huge amounts of time are required to reach it), can thus be avoided or the probability thereof can at least be reduced. In order to make the occurrence of a "deadlock" of this type even less probable, in the case of each query of a participant, the newly self-allocated address can again be transmitted along with a potentially participant-specific sensor signal. Thus, if a query of this type has been sent to the dedicated address of a plurality of devices, a detection of the conflict thus occurring is enabled. The device which does not prevail here can again change its address on the basis of this detection, whereas the prevailing device retains its address.

The addresses A1 . . . A4 used in the above examples are to be regarded purely as examples for the clear illustration of the communication principle according to the invention. The addresses can also be implemented more abstractly in practical use, in particular in the form of digital coding. The mapping functions stored in the devices and the evaluations of conflicts explained here as examples may accordingly be more complex. In particular, the addresses and their mappings do not need to be designed in human-readable form.

Figure 9:
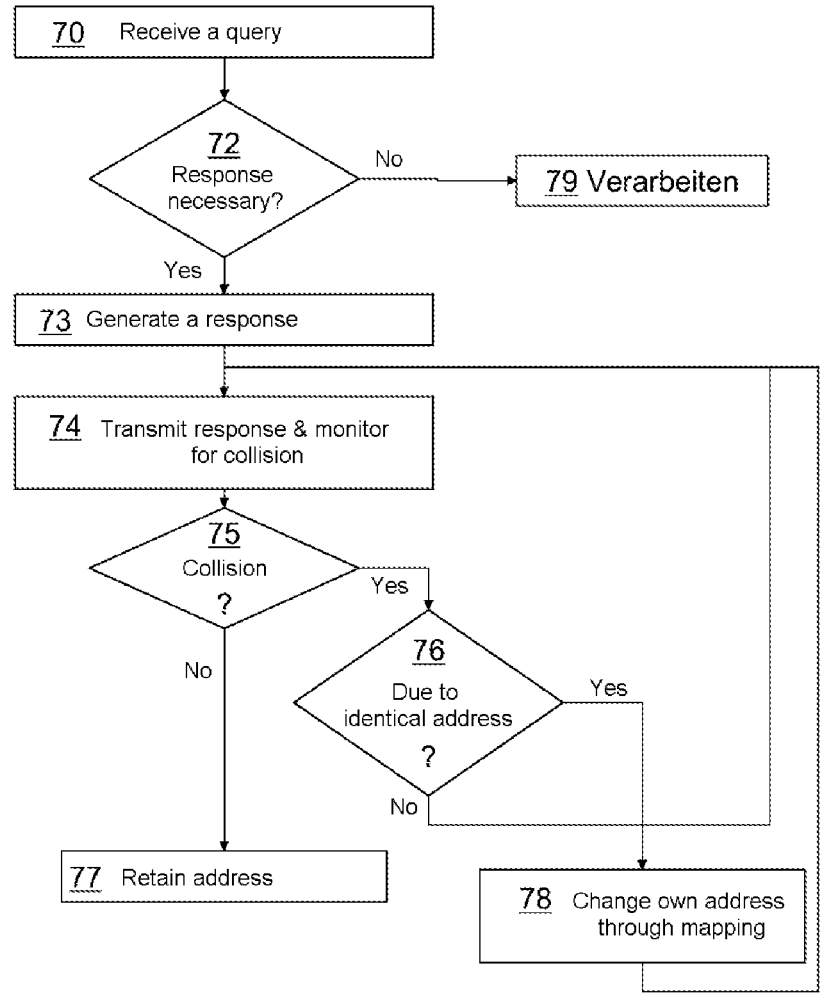
FIG. 9 shows a first example of a simplified flowchart of an embodiment of a machine communication according to the invention.

FIG. 9 shows a first example of a process of a communication according to the invention in a flowchart. A message received by the participant in block 70 is evaluated and, insofar as it is established in block 72 that the message is a query to which the participant must respond, a response is generated in block 73. This response is transmitted on the bus in block 74, wherein a monitoring of the bus for collisions takes place during the transmission.

If no collision is detected in 75, everything is in order and the address can be retained, as block 77 indicates.

If a collision has occurred, a distinction is to be made in block 76 with regard to whether a conflict of identical addresses or a conflict of different addresses, i.e. a pure bus access conflict, has occurred.

The former, i.e. the conflict of identical addresses, requires an allocation of a changed dedicated address of the participant to itself and a subsequent new attempt to transmit the message with this new address in block 74.

If the latter is involved, i.e. a conflict of two different addresses, a new transmission attempt 74 can be carried out without changing the dedicated address when the bus becomes free.

Figure 10A:
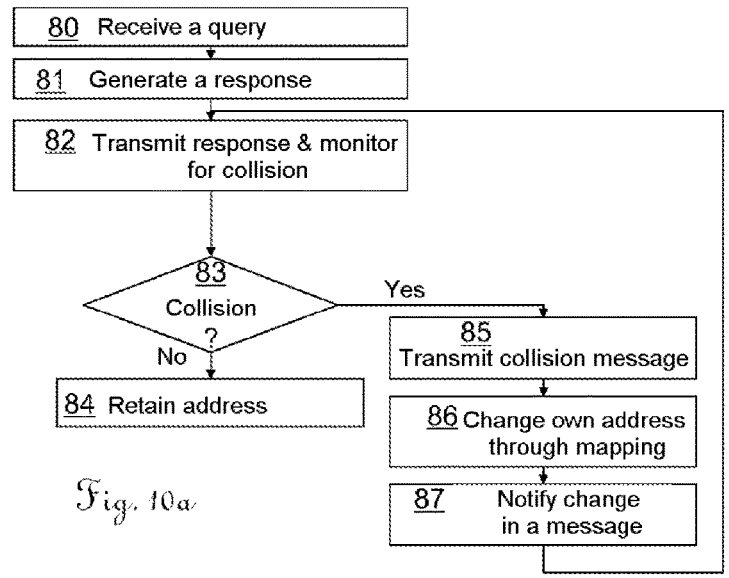
FIG. 10a shows a second example of a simplified flowchart of an embodiment of a machine communication according to the invention.

FIG. 10a shows a second example of a process of a communication according to the invention in a flowchart.

In response to a query received in block 80, a response is generated in block 81 and this response is transmitted in block 82, with monitoring for any collisions, on the common communication medium. If a collision occurs in block 83, a collision message is transmitted with block 85, the dedicated address is changed through mapping in block 86 and this change is communicated, e.g. with the old and new address, in block 87 to all other participants, and the processing of the query is concluded.

Figure 10B:
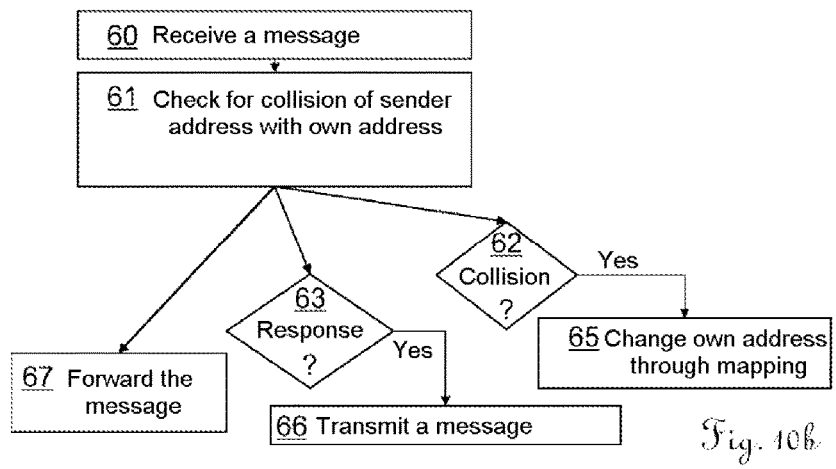
FIG. 10b shows a third example of a simplified flowchart of an embodiment of a machine communication according to the invention.

FIG. 10b shows a third example of a process of a communication according to the invention in a flowchart, wherein said communication occurs especially in the case of a bus structure shown in FIG. 1 or FIG. 2.

The message received in block 60 is checked in block 61 for a collision of the sender address contained in the message with the participant-dedicated address. If a collision is detected in block 62, the participant changes its own address in block 65 by means of a mapping, in a simple example therefore by means of e.g. an incrementation of its participant-dedicated address.

If a response is required in block 63, the corresponding response message is transmitted in block 66.

In order to ensure that all participants are reached, the message previously received in block 60 is forwarded in block 67 to the interface on which it was not received.

FIG. 11 shows a first example of a measuring system 98. The measuring device 98 shown is designed as an articulated arm, which is equipped on its movement axes with linear encoders 91 or rotary encoders 90. The articulated arm also has an exchangeable measuring head 92 and a control unit 93. The devices participating in the measurement, i.e. especially the linear encoders 91, rotary encoders 90, the measuring head 92 and the control unit 93, are participants in the communication system according to the invention.

FIG. 12 shows a second example of a measuring system 99 as a coordinate-measuring device with a communication system with participants which communicate according to the present invention. The measuring device 99 shown is designed especially as a coordinate-measuring device in a portal construction, which is equipped with linear encoders 91. The participants may also, in particular, be components which are exchangeable in operation, for example exchangeable measuring probes, or tilt heads with additional rotary encoders, which are connected to the communication system and thus, in the case of an exchange during operation also, can modify the communication system. According to the invention, the newly added participant(s) autonomously and automatically allocate themselves an address which is unique in this communication system, without explicit external influence.

One example of an exchangeable measuring head 92 of this type is fitted to a tilt head 94 in the figure shown. An external control unit 93 coordinates the measuring processes and communicates with the other participants in order to obtain their measurement data. The data processing devices or components with which the measuring system is equipped, i.e. especially the linear encoders 91, the motor-driven tilt head 94, the measuring head 92 and the control unit 93, are designed as participants in the communication system according to the invention.

Along with the measuring systems explicitly shown in FIG. 11 and FIG. 12, the communication method according to the invention can also be used in measuring systems with different structures, e.g. in theodolites, total stations, laser trackers, laser scanners, etc.

Since the communication takes place mainly by means of microprocessors, DSPs, FPGAs, ASICs, etc., the present invention also relates to a computer program product with program code which is stored on a machine-readable medium or a computer data signal, embodied by an electromagnetic wave, in order to carry out the method according to the invention. The program code carries out especially a monitoring of messages on a bus system via which a plurality of participants of a measuring system communicate with one another. If a collision of communication addresses is detected, a changed, participant-dedicated communication address stored in volatile form is allocated as a new dedicated communication address. This applies especially if the program code is executed in a participant of the measuring system.

What is claimed is:

1. A method for address allocation of participant-specific communication addresses for participants in a measuring system, the method comprising:
performing a communication between the participants, which communication takes place via a bus system by means of messages with at least one communication address and a message content, wherein in the bus system the messages that are communicated by any of the participants are received by all other participants;

carrying out an automatic address iteration for at least one of the participants during a calibration or referencing of the measuring system, wherein the automatic address iteration comprises:
  monitoring of the messages on the bus system; and
  detecting of a collision by a communication address of a received message, which is identical to a participant-dedicated communication address of the at least one of the participants;
providing a collision-related allocation of a changed participant-dedicated communication address of the at least one of the participants to the at least one of the participants, which changed participant-dedicated communication address does not collide with the communication address of the received message; and
performing a defined stimulation of at least one sensor of the at least one of the participants to obtain one or more sensor values, which defined simulation is carried out within the calibration or referencing of the measuring system; and
performing a determination of an address-device allocation of the participants in the measuring system, which determination takes place using the one or more sensor values obtained by the defined stimulation.

2. The method as claimed in claim 1, wherein:
for the automatic address iteration, each of the participants providing a provided message transmitted by the respective participant, each provided message having a participant-specific message content; and
in a case of identical communication addresses, establishing a high probability of collision of the provided messages from the participants through the participant-specific message content of each provided message.

3. The method as claimed in claim 2, further comprising:
forming the participant specific message content of the provided messages from all of the participants using a sensor measurement value defined by the respective participant for the respective participant specific message content.

4. The method as claimed in claim 2, further comprising:
forming the participant specific message content of the provided messages from all of the participants using a random number generated in the respective participant for the respective participant specific message content.

5. The method as claimed in claim 2, further comprising:
performing an allocation of a new participant-dedicated communication address using a mapping function for a participant which detects a collision in the detecting of the collision by the communication address of the received message; wherein:
the mapping function is designed in such a way that the automatic address iteration converges towards participant-specific addresses for all of the participants of the measuring system,
wherein the mapping function depends on the participant specific message content provided by the respective participant.

6. The method as claimed in claim 5, further comprising:
defining of the new participant-dedicated communication address takes place using the mapping function, which is effected by incorporating a difference between messages in the detecting of the collision by the communication address of the received message, in order to avoid a simultaneous, similar change of the communication address in a plurality of the participants.

7. The method as claimed in claim 1, wherein:
a participant, when allocating a changed communication address to itself, transmitting a message with its old and its new address.

8. The method as claimed in claim 1, wherein:
the collision-related allocation of a changed participant-dedicated communication address is activatable or deactivatable; and
wherein, after receiving a specific lock message, one or more of the participants fixes its participant-dedicated communication address and carries out no further allocation of a changed communication address to itself, wherein, by means of a reset message, a reset signal or through shutdown of the participants, the collision-related allocation of a changed participant-dedicated communication address is reactivated.

9. The method as claimed in claim 8, further comprising:
when attempting a subsequent detecting of a collision by a communication address of a received message is free from collisions, a convergence of the automatic address iteration is detected and the collision-related allocation of a changed participant-dedicated communication address is deactivated, wherein a unique participant-dedicated communication address for each participant is stored in a non-volatile memory following the convergence of the automatic address iteration,
wherein the stored communication address for each participant serves in future as an initial value for a subsequent new address iteration.

10. The method as claimed in claim 1, further comprising:
storing the participant-dedicated communication address only in volatile form in the at least one of the participants.

11. The method as claimed in claim 1, wherein:
communication interfaces of the bus system are designed according to RS422, RS423, RS323 or RS485 specification;
wherein all participants are additionally connected to a global, common clock trigger signal line, by which
a synchronization of participant-internal, local clock signals takes place in the participants, which are used for communication and/or measurement value acquisition in the participants, and a triggering of an acquisition of a measurement value.

12. A participant in a two-way measuring system communication,
which has:
a message processor which is designed in such a way that it carries out the automatic address iteration method as claimed in claim 1; and
at least one communication interface operable by the message processor for a communicative connection to at least one further participant via messages on the bus system, which is part of the two-way measuring system communication, wherein in the bus system a message transmitted is receivable by all participants of the bus system.

13. The participant as claimed in claim 12, wherein:
the participant has a random number generator and/or a measurement value sensor and an establishment of a high probability of collision of the message on the bus system of the two-way measuring system communication takes place for the automatic address iteration in the case of identical participant-dedicated communication addresses with a participant-specific message content as a potentially participant-unique value of the random number generator and/or the measurement value sensor.

14. The participant as claimed in claim 12, comprising a measurement value sensor in a position-measuring system of a Coordinate Measurement Machine (CMM).

15. A coordinate-measuring system comprising:
a communication system with measurement value sensors as participants of the communication system, which participants of the communication system are configured to operate with the method claimed in claim 1; and
at least one exchangeable device which is exchangeable in operation, is configured to be connected to the communication system as at least one participant of the communication system.

16. One or more non-transitory computer-readable media storing one or more programs that are configured, when executed, to cause one or more processors to execute the method as claimed in claim 1.

17. The one or more non-transitory computer-readable media according to claim 16, wherein the one or more programs carries out a monitoring of messages on a bus system via which a plurality of participants of a measuring system communicate with one another, and, on detection of a collision due to identical communication addresses, allocates a changed, participant-dedicated communication address to at least one of the participants which is executing the one or more programs.

18. The method as claimed in claim 1, wherein the measuring system comprises a position-measuring system of a coordinate-measuring device with measuring sensors as participants.

19. The method as claimed in claim 1, wherein the determination of an address-device allocation of the participants includes identification of the participants in their sequence and/or function in the measuring system.

20. The method as claimed in claim 1, wherein the communication takes place with a serial structure in each case between two of the participants.

21. The method as claimed in claim 1, wherein the communication takes place with a serial structure via a common communication medium.

22. The method as claimed in claim 1, wherein:
by the address-device allocation, an identification of the participants in their sequence and/or function in the measuring system takes place.

23. A method for address allocation of participant-specific communication addresses for a plurality of participants in a measuring system, the method comprising:
transmitting messages from one participant of the plurality of participants to each of the other participants of the plurality of participants via a bus system, wherein the messages include at least one communication address and a message content;
carrying out an automatic address iteration during calibration or referencing of the measuring system for at least one of the participants, the automatic address iteration includes:
monitoring of the messages on the bus system, and
detecting of a collision by a communication address of a received message, which is identical to a participant-dedicated communication address of the at least one of the participants;
allocating changed participant-dedicated communication address of the at least one of the participants to the at least one of the participants, which changed participant-dedicated communication address does not collide with a received message; and
determining of an address-device allocation of the participants in their sequence using a sensor value of a stimulation of a sensor of the at least one of the participants, which sensor value is derived in the calibration or referencing of the measuring system.

* * * * *